US009296470B1

(12) United States Patent
Moselage, III

(10) Patent No.: US 9,296,470 B1
(45) Date of Patent: Mar. 29, 2016

(54) DEPLOYABLE APPARATUS FOR USE WITH AIR VEHICLES

(71) Applicant: The Boeing Company, Chicago, IL (US)

(72) Inventor: John Henry Moselage, III, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 442 days.

(21) Appl. No.: 13/797,115

(22) Filed: Mar. 12, 2013

(51) Int. Cl.
*B64C 1/10* (2006.01)
*B64C 7/00* (2006.01)
*B64D 1/02* (2006.01)
*B64D 1/14* (2006.01)

(52) U.S. Cl.
CPC ... *B64C 7/00* (2013.01); *B64D 1/02* (2013.01); *B64D 1/14* (2013.01)

(58) Field of Classification Search
CPC .............. B64D 1/10; B64D 1/12; B64D 1/02; B64D 1/08; B64D 7/00; B64C 220/121; B64C 2201/128; B64C 2201/201; B64C 2201/206; B64C 206/22
USPC .......................................................... 244/121
See application file for complete search history.

(56) References Cited

U.S. PATENT DOCUMENTS

| 2,107,494 A | * | 2/1938 | Onions et al. ............... 267/64.26 |
| 2,501,559 A | * | 3/1950 | Winzen et al. ............. 244/138 R |
| 3,795,194 A | * | 3/1974 | Kendrick ....................... 102/348 |
| 3,903,801 A | * | 9/1975 | Senoski .......................... 102/348 |
| 3,963,228 A | * | 6/1976 | Karle ............................. 267/166 |
| 4,639,229 A | * | 1/1987 | Wright et al. .................... 441/42 |
| 6,640,739 B2 | * | 11/2003 | Woodall et al. ............... 114/312 |
| 2005/0006525 A1 | * | 1/2005 | Byers et al. ................. 244/118.1 |
| 2012/0043411 A1 | * | 2/2012 | Beck et al. ..................... 244/3.24 |

FOREIGN PATENT DOCUMENTS

GB          2267556 A    * 12/1993  .............. F42B 12/60

* cited by examiner

*Primary Examiner* — Tien Dinh
*Assistant Examiner* — Assres H Woldemaryam
(74) *Attorney, Agent, or Firm* — Hanley, Flight & Zimmerman, LLC

(57) ABSTRACT

An apparatus includes a first tube portion forming a portion of an air vehicle deployable pod and a second tube portion. The first and second tube portions are slidably coupled. The apparatus also includes a cavity formed between the tube portions. The second tube portion slides relative to the first tube portion to reduce the size of the cavity and dissipate energy upon impact of the first tube portion.

26 Claims, 16 Drawing Sheets

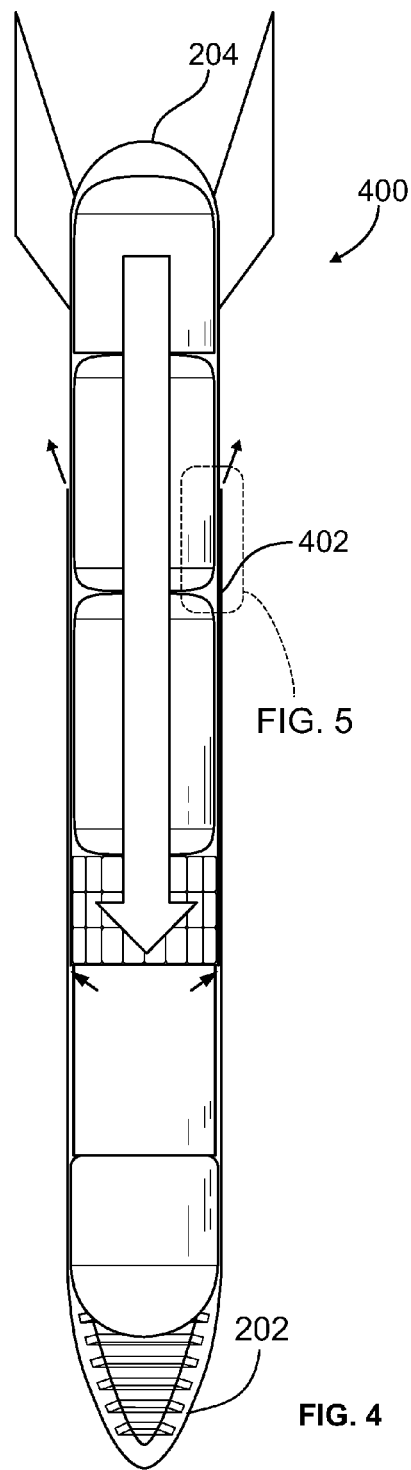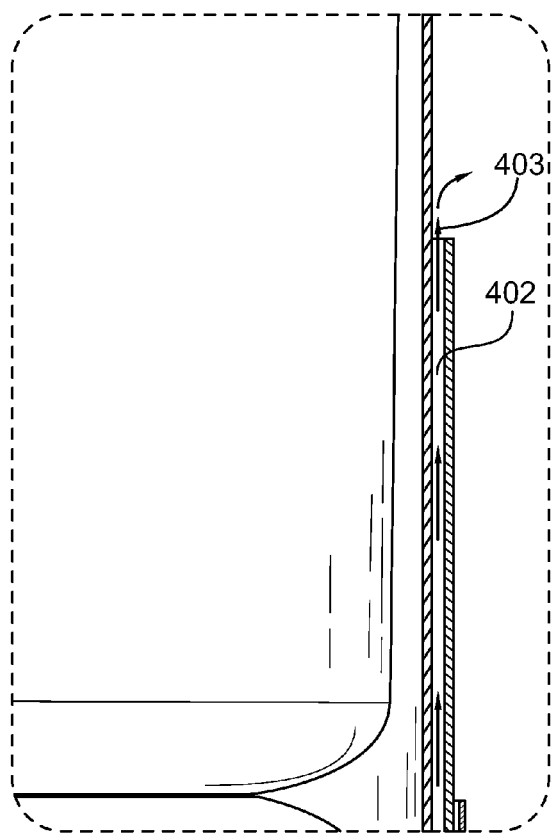
FIG. 4
FIG. 5

DEPLOYABLE APPARATUS FOR USE WITH AIR VEHICLES

FIELD OF THE DISCLOSURE

The disclosure relates generally to deployable apparatus and, more specifically, to deployable apparatus for use with air vehicles.

BACKGROUND

Aircraft such as unmanned vehicles may attempt to provide supplies or cargo to ground troops and/or other personnel in combat operations, humanitarian efforts, or similar endeavors in or near an exposed drop zone (combat), or natural or manmade restrictive area/site (forest, buildings, etc.) using, for example, a slung load. In an attempt to avoid damage to the cargo and improve accuracy of cargo deployment, prior to releasing the load, slung or otherwise, the aircraft may hover or otherwise try to maneuver relatively close to the drop zone. Such low level positioning by the aircraft may potentially expose the aircraft to hazardous conditions.

SUMMARY

An example apparatus includes a first tube portion forming a portion of an air vehicle deployable pod; a second tube portion, the first and second tube portions being slidably coupled; and a cavity formed between the tube portions, wherein the second tube portion slides relative to the first tube portion to reduce the size of the cavity and dissipate energy upon impact of the first tube portion.

The subject matter disclosed herein can be achieved independently in various embodiments or may be combined in yet other embodiments, further details of which can be seen with reference to the following description and drawings.

BRIEF DESCRIPTION OF THE DRAWINGS

FIGS. 4 and 5 depict an example deployable apparatus in accordance with the teachings of this disclosure.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to relatively low cost deployable pods or apparatus that may be used with air vehicles including manned and unmanned aircraft (fixed or rotor wing) to effectively and safely deploy supplies or cargo (contents of the apparatus) to a location such as a deployment area or site for ground troops and/or personnel and/or anyone else in combat operations, humanitarian/rescue efforts, or similar endeavors. The apparatus may be deployed (e.g., dropped) into or near virtually any type of natural terrain or manmade environment using, for example, an electronic targeting system.

Figure 1:
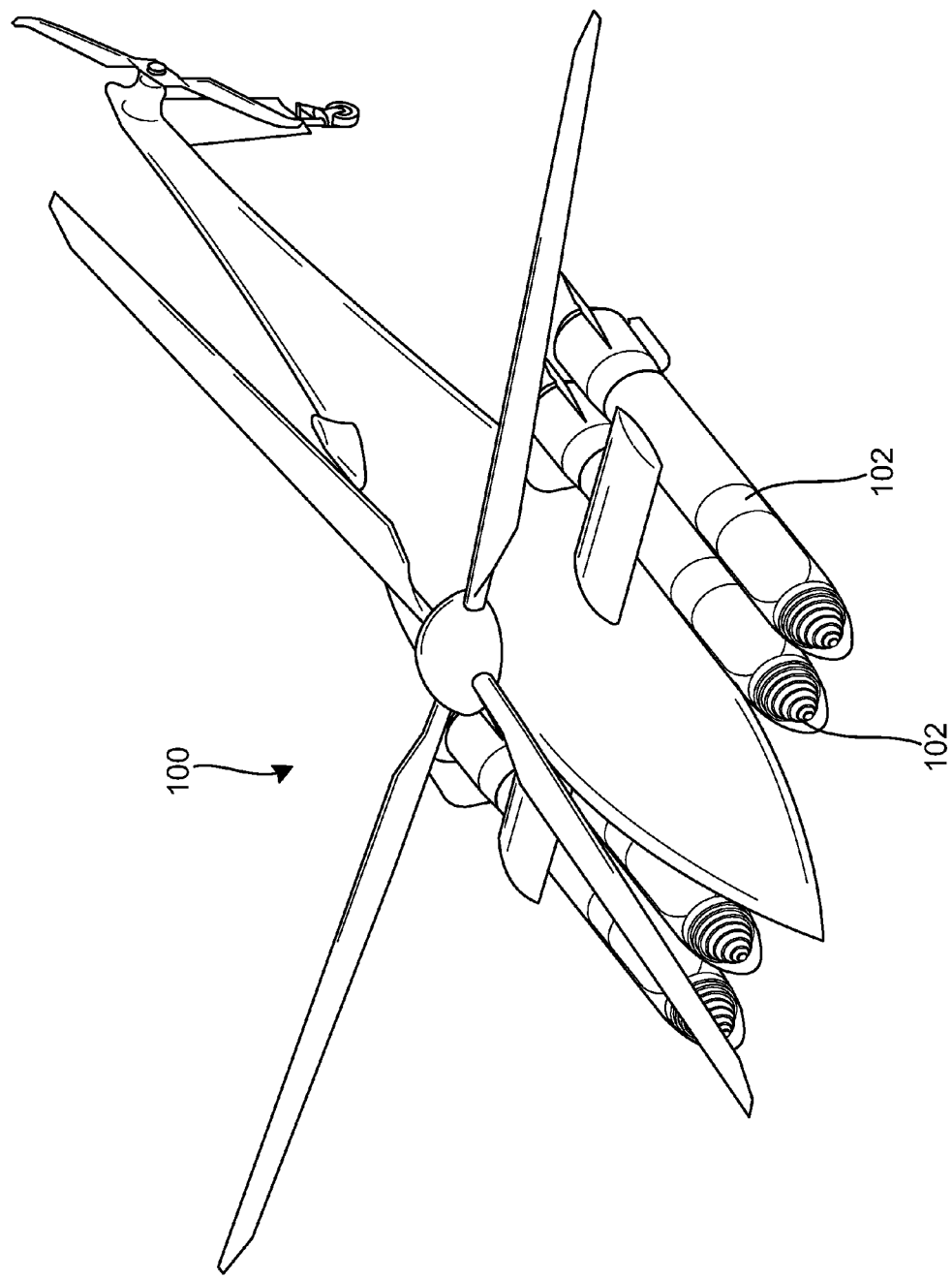
FIG. 1 depicts an example air vehicle with which the example deployable apparatus disclosed herein can be implemented.

FIG. 1 illustrates an example air vehicle 100 including example deployable apparatus or pods 102 in accordance with the teachings of this disclosure. In some examples, the pod 102 may be deployed, for example, using bomb racks such as a multiple ejector rack (MER) and/or a triple ejector rack (TER) without a guidance system and/or without a parachute. In some examples, prior to being deployed (e.g., dropped), the pod 102 may be in a non-extended position, a first compressed position/state, or first position and, after being deployed, portions or sections of the pod 102 move and/or slide relative to one another such that the pod 102 is in an extended or lengthened position, decompressed position/state, or second position. Thus, as the pod 102 moves from the first position/state (compressed) to the second position/state (decompressed), or from the second position/state (decompressed) back to substantially the first position/state (compressed), the pod 102 transitions or moves through varying degrees (greater or lesser) of either the compressed or decompressed state.

Prior to deployment, the pod 102 may be prevented from moving from the non-extended position via a pin coupled to the air vehicle 100 by a wire. Once the pod 102 is deployed (e.g., dropped), the pin may be removed from the pod 102, via the wire, enabling the pod 102 to move to the extended position as it descends. While the example of FIG. 1 illustrates the air vehicle 100 as a helicopter, the pod 102 may be deployed from any type of air vehicle including an airplane, a fixed wing or rotor type aircraft, manned or unmanned aircraft, etc.

Figure 2:
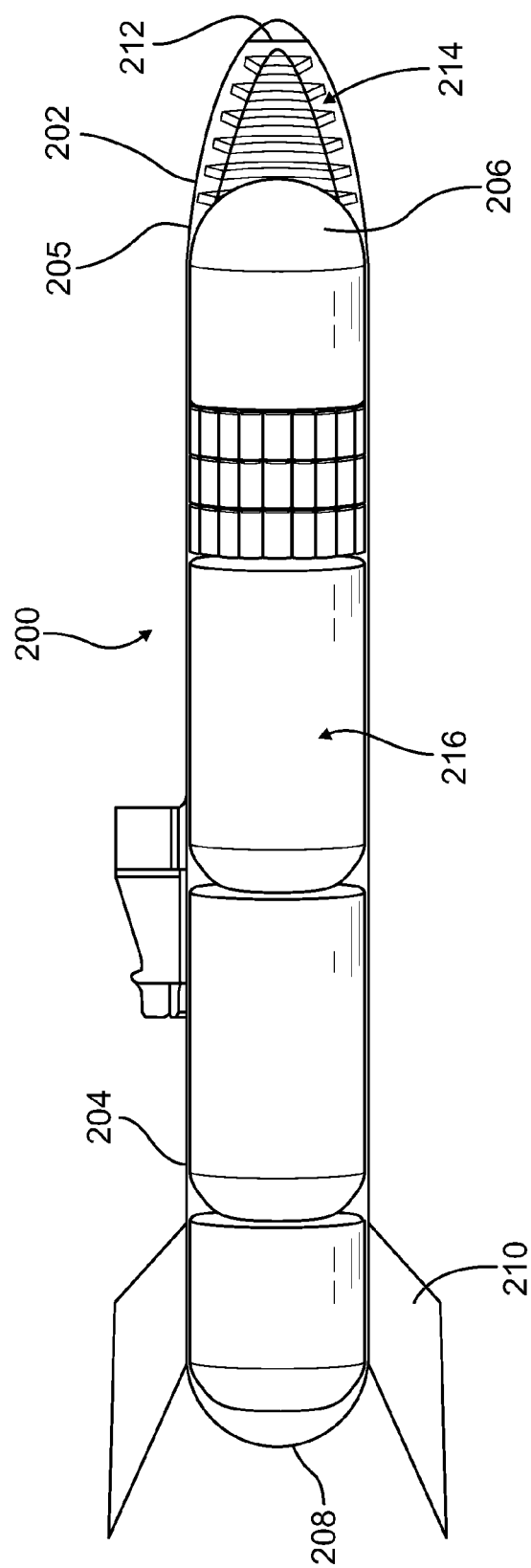
FIG. 2 depicts an example deployable apparatus in a non-extended position.
Figure 3A:
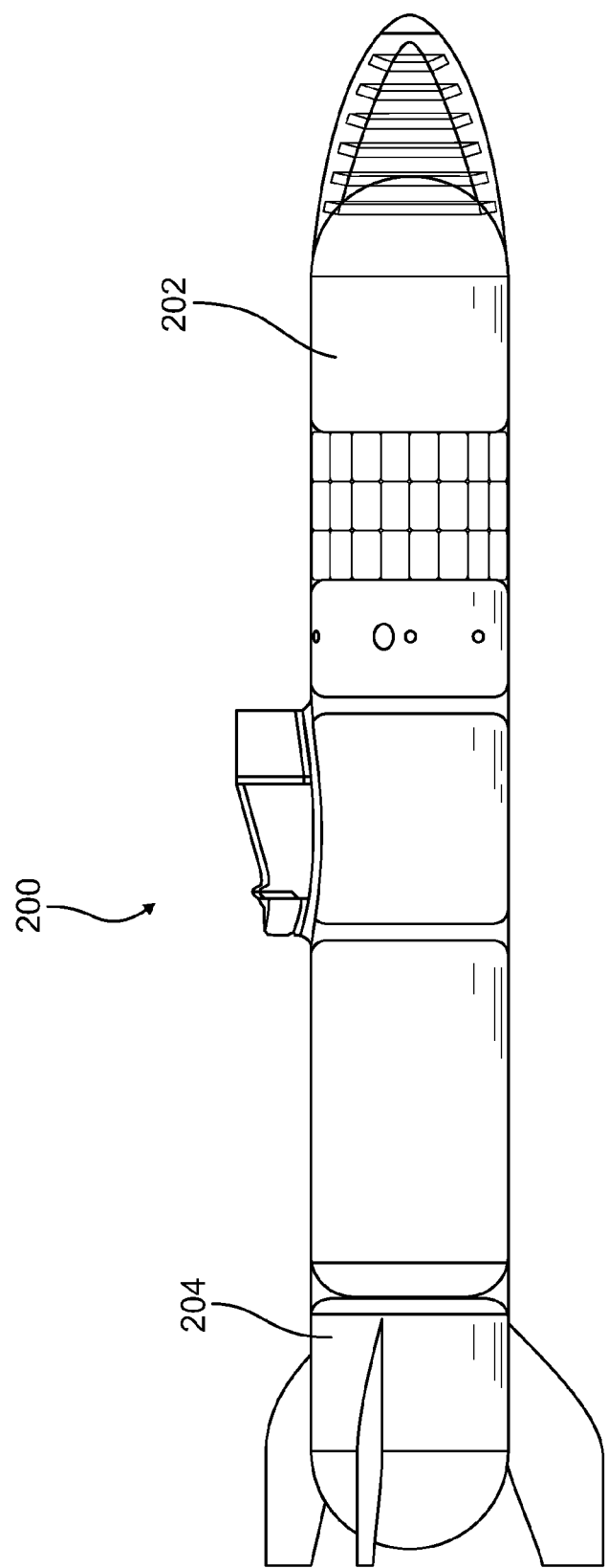
FIG. 3A depicts the deployable apparatus of FIG. 2 prior to deployment.

FIGS. 2 and 3A illustrate an example air vehicle deployable apparatus or pod 200 in a non-extended and/or shorter state or condition and/or prior to being deployed from an air vehicle. Referring to FIG. 2, the pod 200 may be at least partially formed by a first tube portion, a forward tube portion, or an outer tube portion 202. The pod 200 further includes a second tube portion, an aft tube portion, or an inner tube portion 204 at least partially positioned or disposed within (e.g., slidably coupled to) the forward tube portion 202. As discussed below (FIG. 4), inner dimensions (e.g., an inner diameter in examples where the tubes 202, 204 are cylindrical) of the forward tube portion 202 may be greater than outer dimensions (e.g., an outer diameter) of the aft tube portion 204, thereby providing an annular gap or clearance 402 between the tubes 202, 204. This gap or clearance 402 may be sized or dimensioned to allow the aft tube portion 202 to move relative to the forward tube portion 202 in a forward direction of travel and a backward direction of travel (back-and-forth) that corresponds to the direction of travel of the pod 200 when deployed from the air vehicle 100. For example, the gap or clearance 402 enables the tube portions 202, 204 to slide relative to each other between the first compressed state, the expanded state, and a second compressed state upon impact of the pod with the ground or other object. The second compressed state may or may not be substantially the same as the first compressed state. Further, while the particular examples described herein depict the aft tube 204 being dimensioned to slide within (i.e., to be slidably coupled to) the forward tube 202, the outer dimensions of the forward tube 202 may instead be made smaller than the inner dimensions of the aft tube 204 to enable the forward tube 202 to be slidably disposed within or coupled to the aft tube 204 to accomplish the same or similar results. Still further, while the particular examples described herein depict the tubes 202, 204 as having generally cylindrical shapes (e.g., having generally circular cross-sections), any other geometry could be used instead.

In one embodiment, the tube portions 202, 204 may be elongated, cylindrical in shape, and made of cardboard, reinforced cardboard, cardboard having reinforcing bands (e.g., metal) and/or fiberglass coatings and/or similar types of material(s). As such, the air vehicle deployable apparatus or pod 200 may be considered to include the first elongated tube portion 204 disposed within and slidably coupled to the second elongated tube portion 202. The aft tube portion 204 may have capped ends 206, 208 and one or more fins 210, and the forward tube portion 202 may have an energy absorbing nose cone 212 having a crumple zone and/or an energy absorbing (e.g., crushable foam) core 214. The nose cone 212 of the forward tube portion 202 may include an inner surface 205 shaped to receive the capped end 206 of the aft tube portion 204.

Some or all of contents 216 such as supplies or cargo (weighted material other than supplies that may be added for performance of the pod as disclosed herein) may be positioned in either the forward tube portion 202 and/or the aft tube portion 204.

Figure 3B:
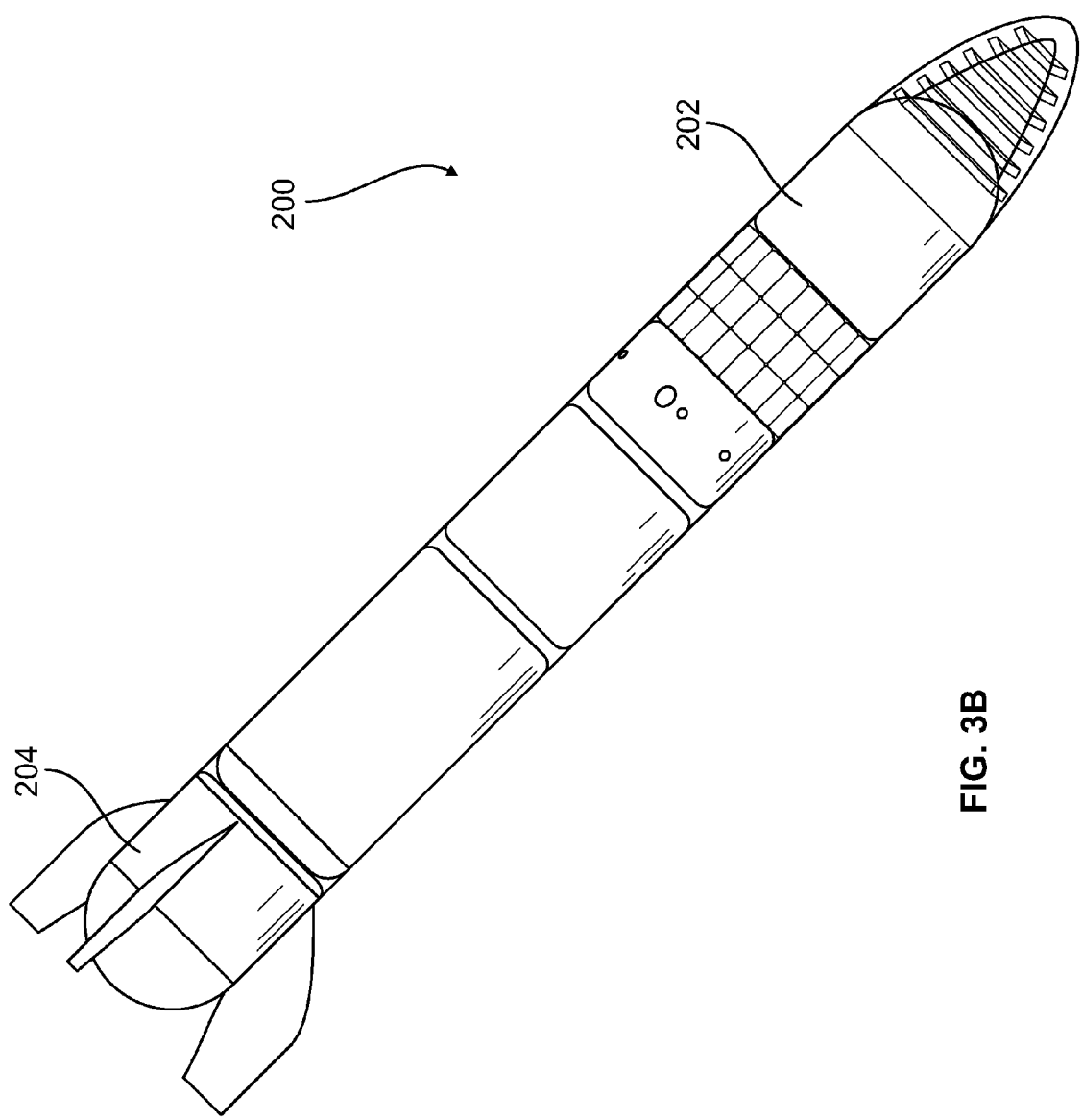
FIG. 3B depicts the deployable apparatus of FIG. 2 after deployment but prior to being in an extended position.
Figure 3C:
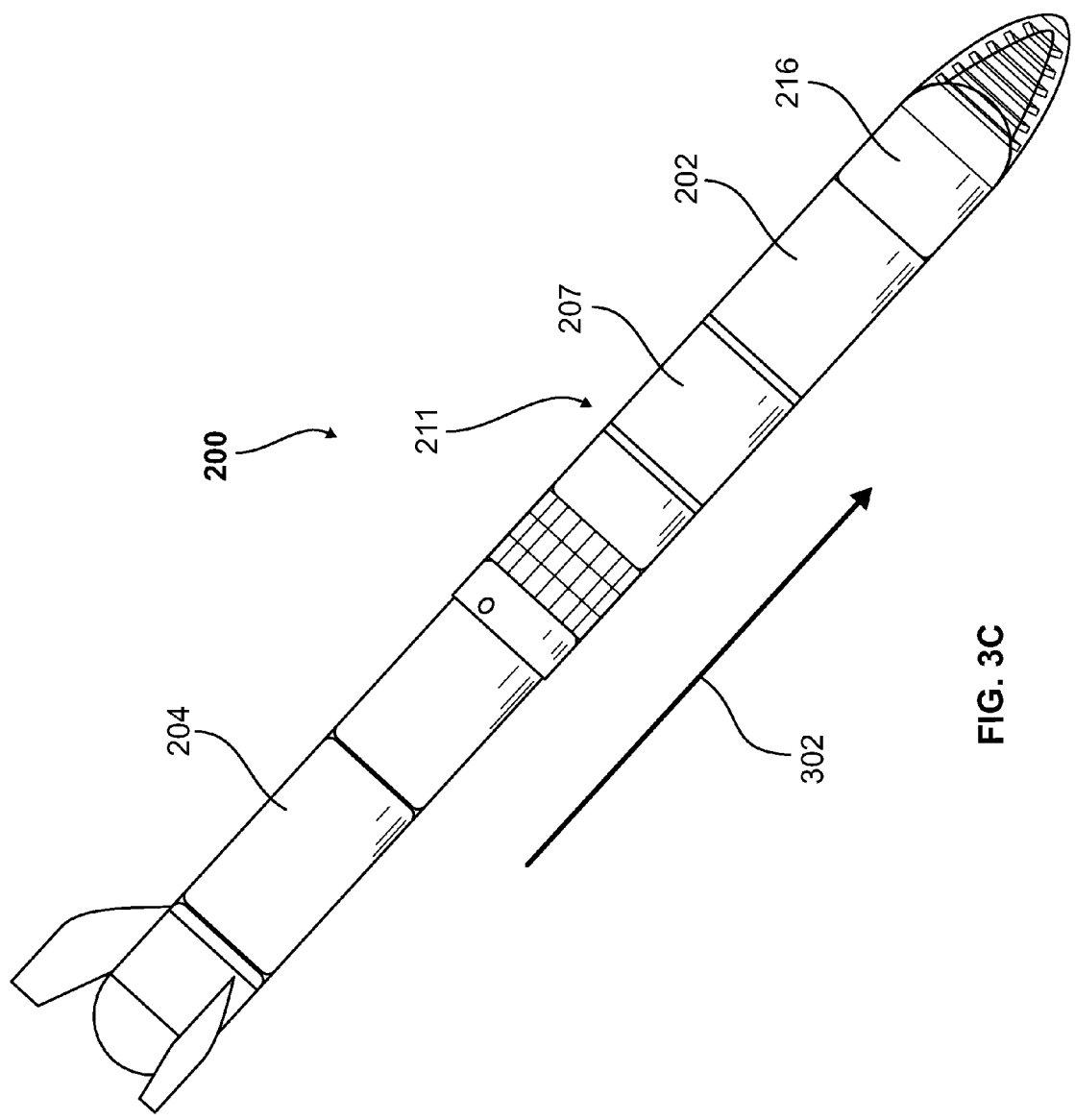
FIG. 3C depicts the deployable apparatus of FIG. 2 after deployment in the extended position.
Figure 6:
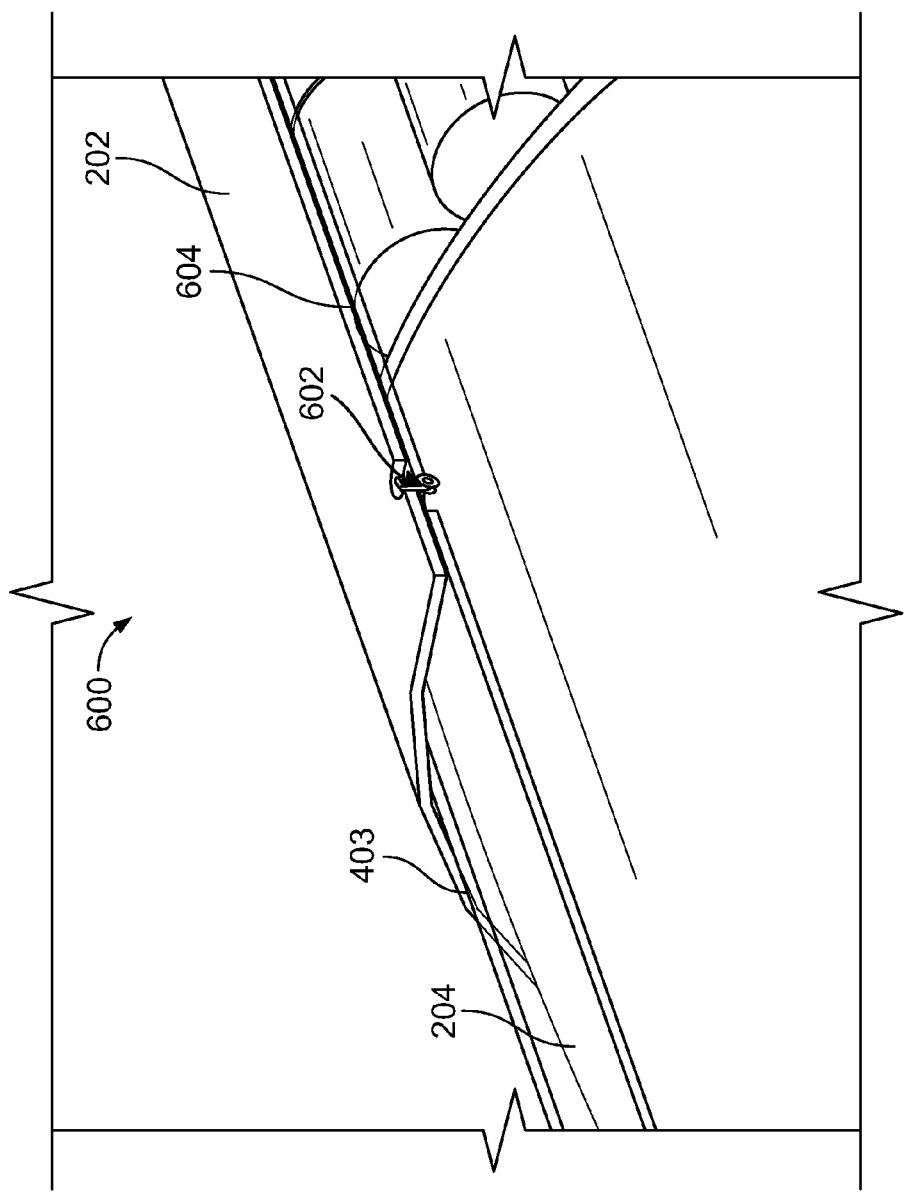
FIGS. 6-11 depict an example apparatus that may be used to absorb impact energy in accordance with the teachings of this disclosure.

Referring to FIGS. 3B and 3C, the pod 200 is shown descending following deployment from the air vehicle 100. Specifically, FIG. 3B shows the pod 200 in the non-extended position and/or prior to being in the extended position, and FIG. 3C shows the pod 200 in the deployed, extended and/or lengthened position. To point the nose cone 212 downwardly and/or in a direction generally indicated by arrow 302 as the pod 200 descends, a section of the forward tube portion 202, for example, the nose cone 212, may be weighted, for example, with some of the contents 216 such as supplies and/or cargo (e.g., water, ammunition). In this regard, some of the contents 216 may be distributed such that a relatively heavier portion of the contents 216 is positioned toward the nose cone 212 in the forward tube portion 202 when compared to the portion of the contents 216 positioned in aft tube portion 204.

To urge the tube portions 202, 204 toward the extended position, the aft tube portion 204 includes the one or more fins 210 to urge the aft tube portion 204 away from the forward tube portion 202, via drag, when the pod 200 descends following deployment from the air vehicle 100. Additionally or alternatively, the fins 210 may be sized and/or configured to change and/or decrease the terminal velocity of the pod 200 as it descends. In some examples, once the tube portions 202, 204 are in the extended position, the tube portions 202, 204 may be secured relative to one another and/or engage hard stops to prevent further relative movement of the tube portions 202, 204.

Additionally or alternatively, to urge the tube portions 202, 204 toward the extended position, a gas (e.g., carbon dioxide or a similar fluid) 207 may be released and contained temporarily within one or more of the tube portions 202, 204 to increase the pressure within or between the tube portions 202, 204 to move the tube portions 202, 204 from the first, compressed position to the second, extended position. Thus, the second tube portion 204 may be slidably disposed within and spaced apart from the first tube portion 202 to form a fluid filled cavity or chamber 211 between the first tube portion 202 and the second tube portion 204. Upon impact of the first tube portion 202 with the ground or other object, the second tube portion 204 slides within the first tube portion 202 toward the first tube portion 202 to reduce the size of the fluid cavity 211. Specifically, as the second tube portion 204 moves toward the first tube portion 202, the volume of the cavity or chamber 211 decreases to cause the restricted release of some or substantially all of the fluid 207 from within the cavity 211, thereby dissipating energy associated with the impact and generally protecting the second tube portion 204, the pod 200, and/or any contents of the pod 200 from damage.

In one example, following deployment and prior to impact, the fluid 207 may be released from the capped end 206 of the aft tube portion 204 to contact the inner surface 205 of the nose cone 212 of the forward tube portion 202, thereby forcing the forward tube portion 202 away from the aft tube portion 204 to form the fluid filled cavity 211 and move the pod 200 from the first position to the second position. An altitude sensor (not shown) may be programmed or set to activate the release of the fluid 207 and form the fluid filled cavity 211 at a designated or predetermined altitude of the pod 200 relative to an impact site and/or a particular amount of time after being deployed from the air vehicle 100.

FIGS. 4 and 5 illustrate a detailed view of an example deployable apparatus and/or pod 400 that can be used to implement examples of the subject matter disclosed herein. The pod 400 includes the tube portions 202, 204 and the gap (e.g., a controlled annular gap or clearance) 402 (See FIG. 5) corresponding to a space or tolerance between the aft tube portion 204 positioned or disposed within the forward tube portion 202. The gap 402 terminates in an orifice 403 corresponding to an edge of the forward tube portion 202 opposite the nose cone 212. The gap 402 provides a restriction along a flow path through which fluid (e.g., air, carbon dioxide, etc.) from the cavity 211 is released to the atmosphere upon impact of the pod 400. In other words, the restriction provided by the gap 402 functions to controllably release the fluid from the cavity 211 and, thus, controllably dissipate the energy of an impact to protect the pod 400 and any contents (e.g., supplies) of the pod 400 to be delivered to a location associated with an impact site.

In the illustrated example, when the pod 400 impacts an object or site such as the ground, the aft tube portion 204 moves from the second state back to substantially the first state. Specifically, the aft tube portion 204 moves toward the forward tube portion 202 to compress the fluid 207 against the inner surface 205, urge the fluid 207 out of the fluid filled cavity 211 through the gap 402 between the tube portions 202, 204, and expel the fluid 207 external to (e.g., into an atmosphere surrounding) the pod 200 via the orifice 403 to absorb or dissipate impact energy and cushion the pod 400 and its contents upon impact.

In some examples, a cylinder (e.g., a gas cylinder) having a check valve is positioned within the forward tube portion 202 to receive and retain air or another fluid at an increased pressure when the aft tube portion 204 moves forward and compresses the air or other fluid. Once the aft tube 204 is at the end of the travel and/or in the second compressed position, the pressure differential across the check valve causes the check valve to close and retain the air or other fluid at a higher pressure within the cylinder.

Figure 7:
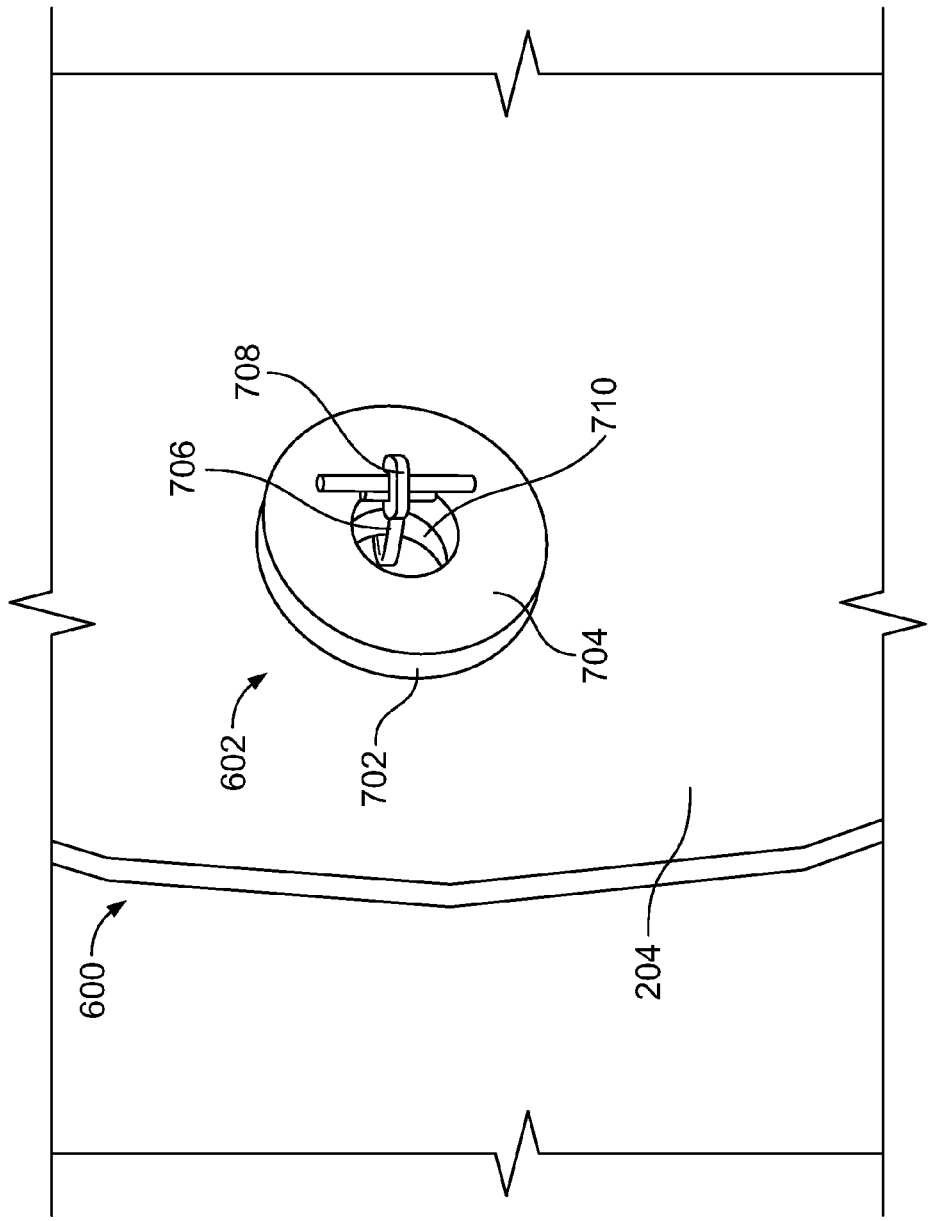
Figure 8:
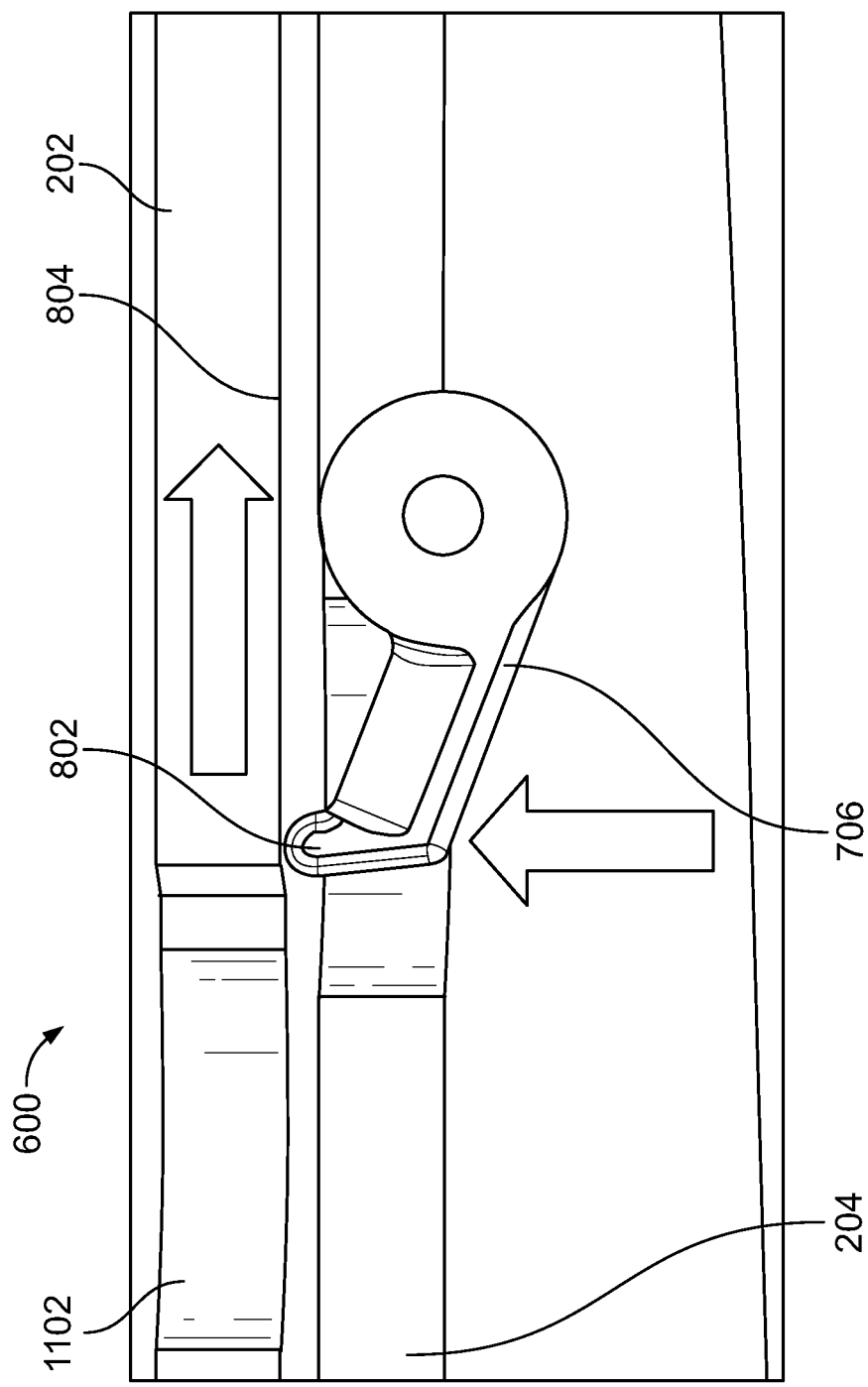
Figure 9:
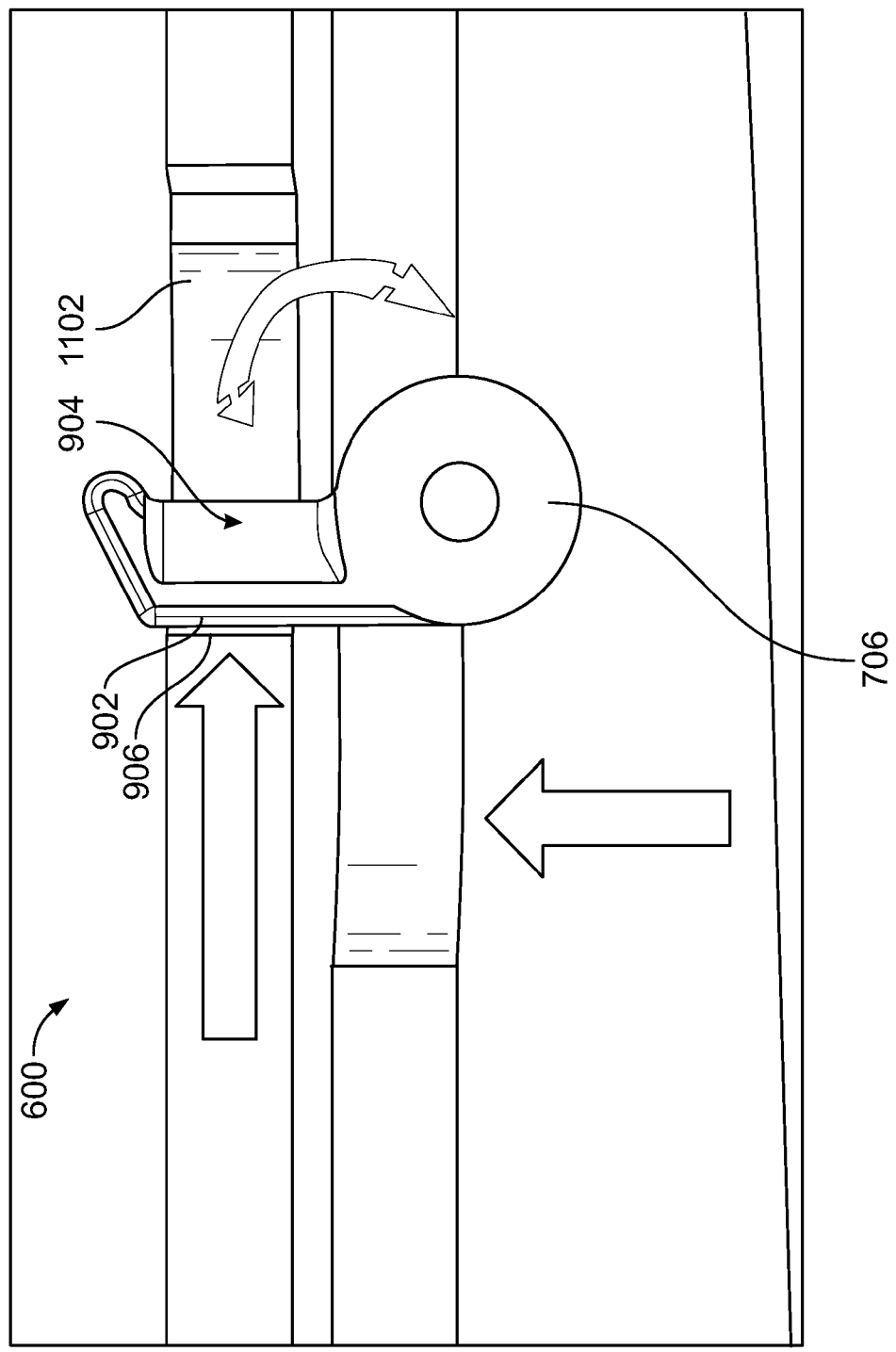
Figure 10:
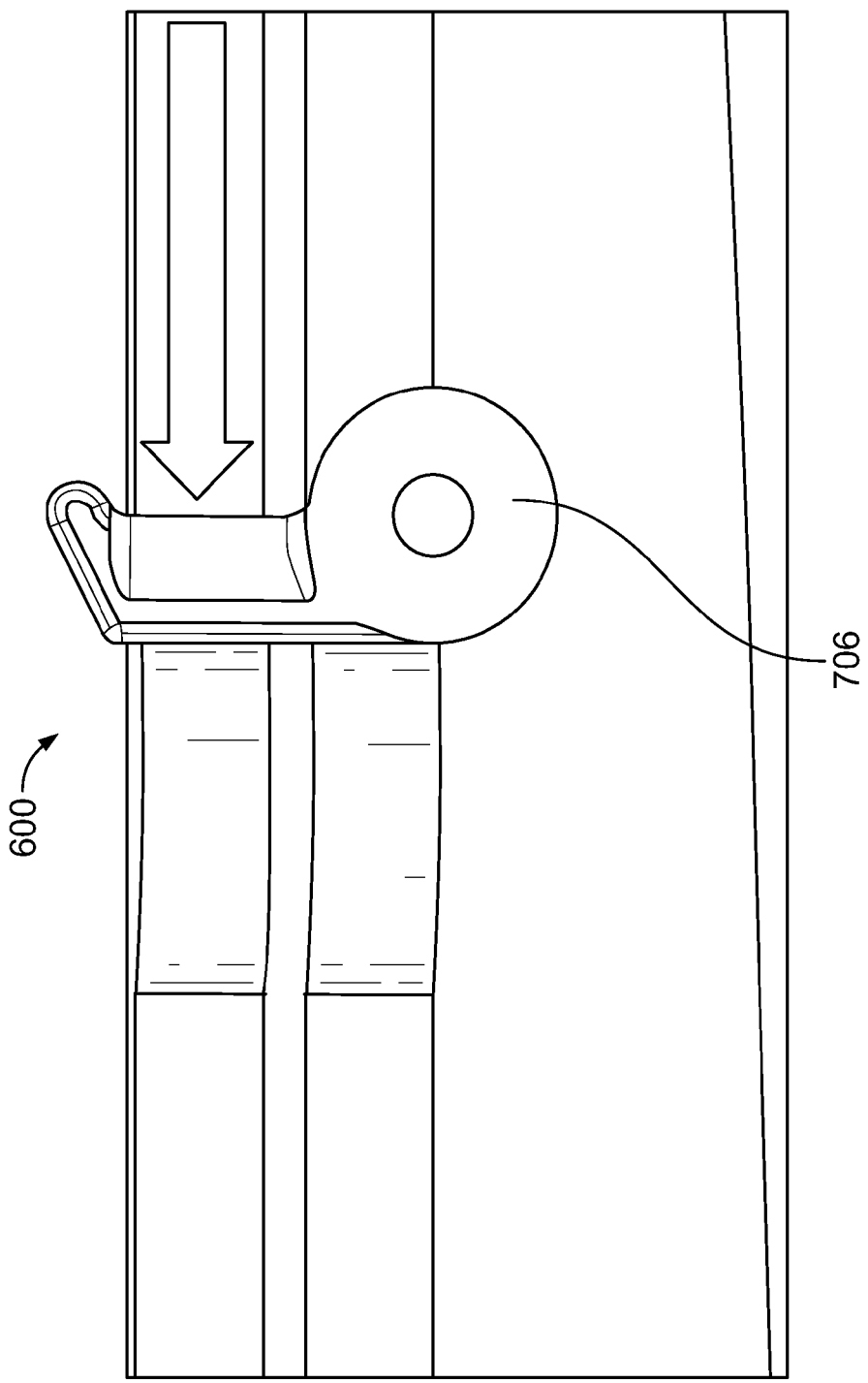
Figure 11:
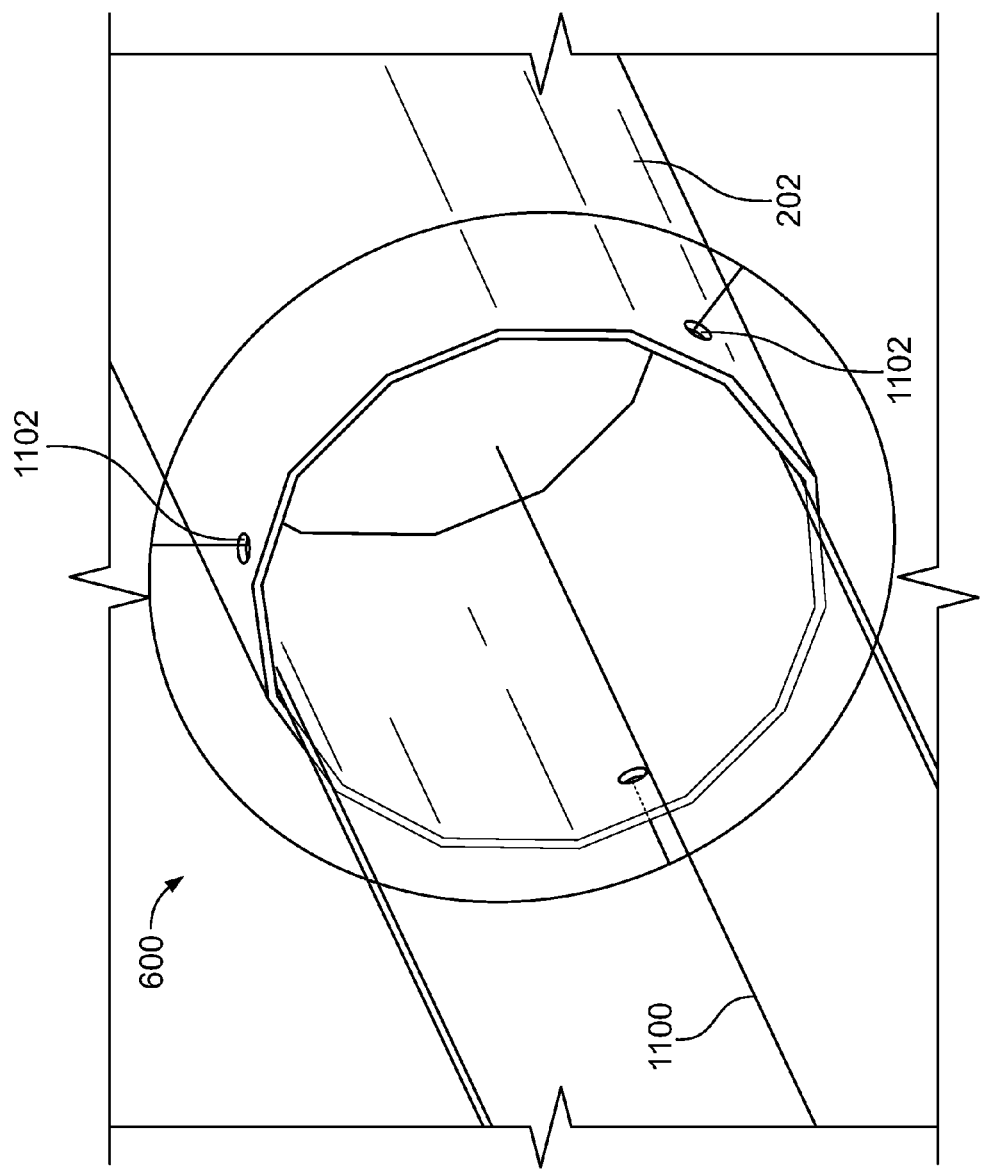

FIGS. 6-11 illustrate an example apparatus and/or pod 600 that may be used to implement the examples disclosed herein. The pod 600 includes the tube portions 202, 204 and one or more brakes 602 used to release and/or dissipate energy from the pod 600 upon impact. As shown in FIG. 7, the brake(s) 602 may be implemented as a cutter including first and second opposing plates 702, 704 and a lockable and/or spring-biased knife 706 that pivots about a pivot point 708. The plates 702, 704 couple and/or lock together and/or partially extend through an aperture 710 defined by the aft tube portion 204. Increasing or decreasing the number of knives 706 correspondingly increases or decreases the drag or an amount of friction due to engagement of the brake 602 with the one or both of the tubes 202, 204 as described in more detail below. This drag or friction may establish a substantially constant g-force to decelerate the pod 600 to reduce or otherwise minimize damage to any contents of the pod 600 upon impact of the pod 600.

In the illustrated example, prior to being deployed from an air vehicle 100 (e.g., airplane, helicopter, etc.), the tube portions 202, 204 are in a non-extended position and the knife 706 is in a stowed position such that a hook-shaped end 802 (FIG. 8) of the knife 706 engages an inner surface 804 of the forward tube portion 202. When the pod 600 is deployed from an air vehicle 100, the tube portions 202, 204 move and/or extend relative to one another to an extended position to enable the one or more knives 706 to be in a deployed or braking position that is substantially perpendicular (FIG. 9) relative to a longitudinal axis 1100 (FIG. 11) of the aft tube portion 204 and into and/or through respective apertures and/or slots 1102 defined by the forward tube portion 202. In some examples, the end 802 may ride and/or engage within a groove (not shown) of the forward tube portion 202 to substantially prevent the tube portions 202, 204 from rotating relative to one another and/or substantially maintain the alignment (e.g., central alignment) of the aft tube portion 204 relative to the forward tube portion 202 prior to the tube portions 202, 204 being in the extended position.

Additionally or alternatively, the tube portions 202, 204 may have a non-circular cross-section (e.g., oval-shaped, polygonal, etc.) to maintain alignment and substantially prevent the tube portions 202, 204 from rotating as the tube portions 202, 204 move to the extended position.

When in the deployed position, a non-sharp (e.g., blunt) surface 902 (FIG. 9) of the knife 706 faces in a direction toward the aft tube portion 204 and a sharp surface (e.g., a cutting edge) 904 (FIG. 9) of the knife 706 faces in a direction toward the forward tube portion 202. An interaction between the non-sharp surface 902 and a surface 906 of the aperture 1102 substantially stops or prohibits the movement of the tube portions 202, 204 relative to one another and/or secures or locks the tube portions 202, 204 in the extended position. While this example shows the knife 706 rotating about an axis that is substantially perpendicular relative to the longitudinal axis 1100, in other examples, the knife 706 may rotate about an axis substantially parallel to the longitudinal axis 1100. In still other examples, a detent ball or cone may be urged radially outward, via a spring, to be positioned in the aperture 1102 and cut, expand, or otherwise deform the forward tube portion 202 as the aft tube portion 202 moves relative thereto. In some examples, to enable the fluid to fill the inside of the forward tube portion 202 as the tube portions 202, 204 separate, the pod 600 may include one or more check valves.

When the pod 600 impacts the ground or other object, the aft tube portion 204 moves forward, compresses the fluid between ends of the tube portions 202, 204 and urges the fluid through a gap 604 (FIG. 6) between the tube portions 202, 204 and/or drives the one or more knives 706 to frictionally engage (e.g., cut through or otherwise deform) the forward tube portion 202 to dissipate energy and cushion the impact for the contents within the aft tube portion 204. In some examples, as the forward tube portion 202 is frictionally engaged and/or deformed (e.g., is cut) by the one or more knives 706, fluid exit paths are created that reduce the pressure within the pod 600 and/or substantially prevent the aft tube portion 204 from springing rearward due a pressure increase within the cavity 211 between the tubes 202, 204. In some examples, to substantially prevent the forward tube portion 202 from rupturing upon impact, the nose cone 212 may include a weakened area that extends circumferentially about an outer surface of the nose cone 212. Upon impact, this weakened area causes the nose cone to break or collapse upon impact and enables the forward tube portion 202 to remain substantially pressurized as the contents decelerate.

While the foregoing example describes the brake 602 as being implemented by a cutter that cuts, tears or deforms one of the tube portions 202, 204 to form an opening therethrough, any other form of frictional engagement between the brake 602 and one of the tubes 202, 204 may be used instead. For example, that brake 602 may scribe or score a groove in one of the tubes 202, 204, rub against one of the tubes 202, 204, or otherwise deform one of the tubes 202, 204.

Figure 12:
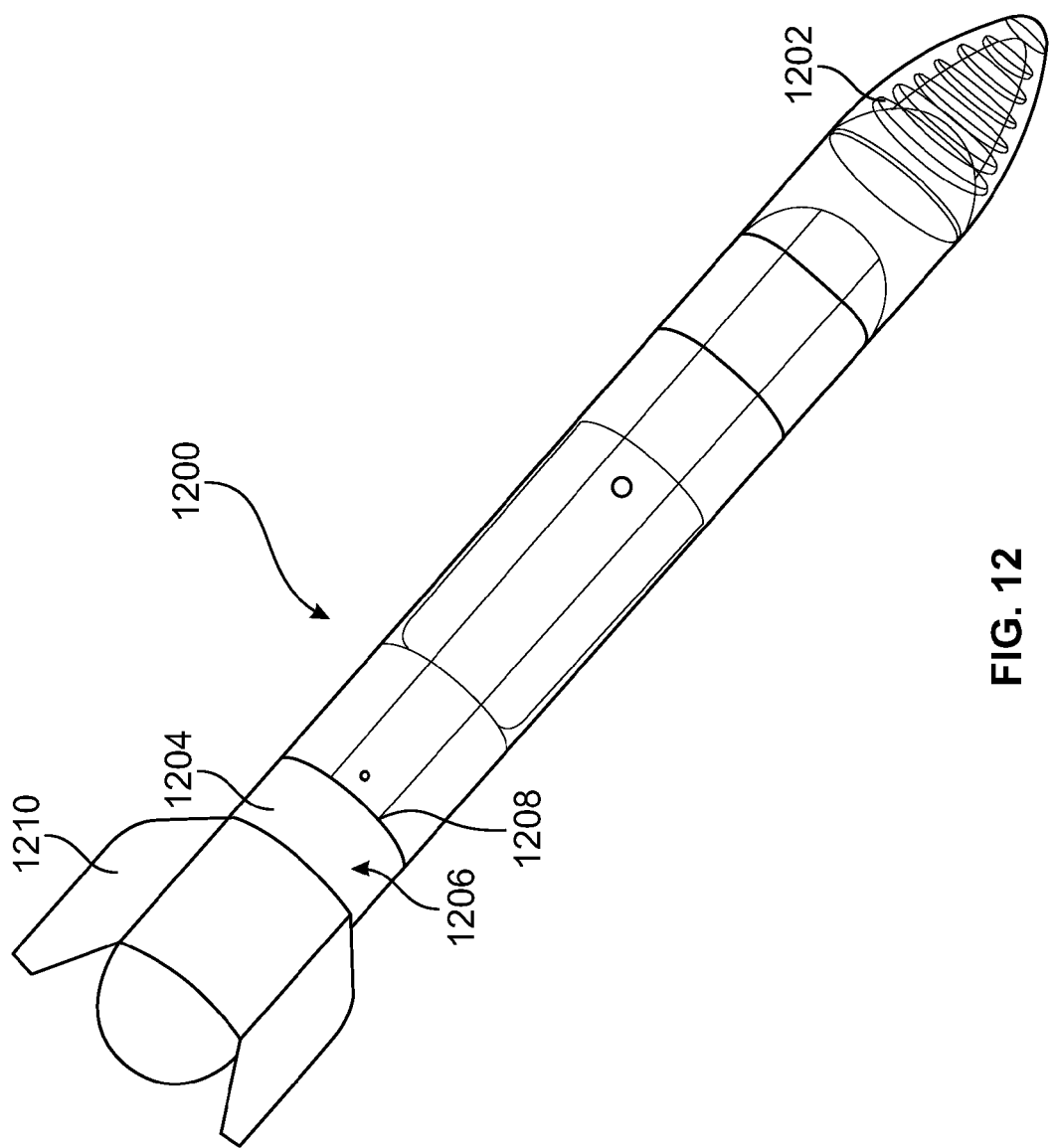
FIGS. 12 and 13 depict another example deployable apparatus in accordance with the teachings of this disclosure.
Figure 13:
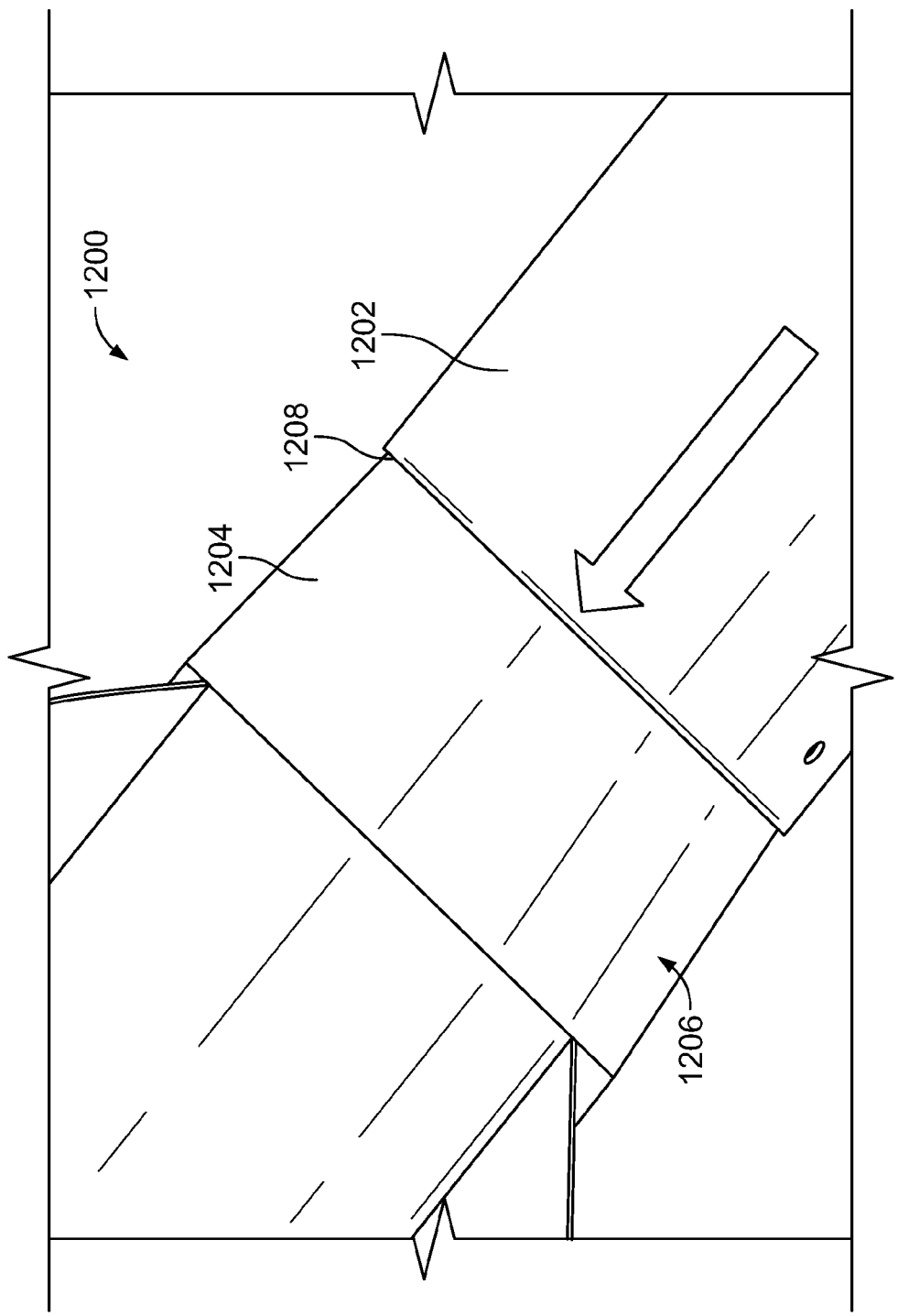

FIGS. 12 and 13 illustrate an example apparatus and/or pod 1200 that can be used to implement the examples disclosed herein. The pod 1200 may be at least partially formed by a first tube, a forward tube portion, or an outer tube 1202. The pod 1200 further includes a second tube, an aft tube portion, or an inner tube 1204 at least partially positioned or slidably disposed within the forward tube portion 1202. In the illustrated example, to controllably decelerate the pod 1200, the aft tube portion 1204 includes tapered radial surfaces and/or a varying diameter forward facing end and/or portion 1206 that functions as a brake by expanding and/or ripping an end 1208 of the forward tube portion 1202 as the aft tube portion 1204 moves toward the forward tube portion 1202 to cushion the impact for the contents within the aft tube portion 1204 and/or forward tube portion 1202. Additionally or alternatively, to controllably decelerate the contents of the pod 1200 when the pod 1200 impacts the ground, one or more fins 1210 on the aft tube portion 1204 may be configured to function as brakes by cutting and/or slicing through the forward tube portion 1202.

Figure 14:
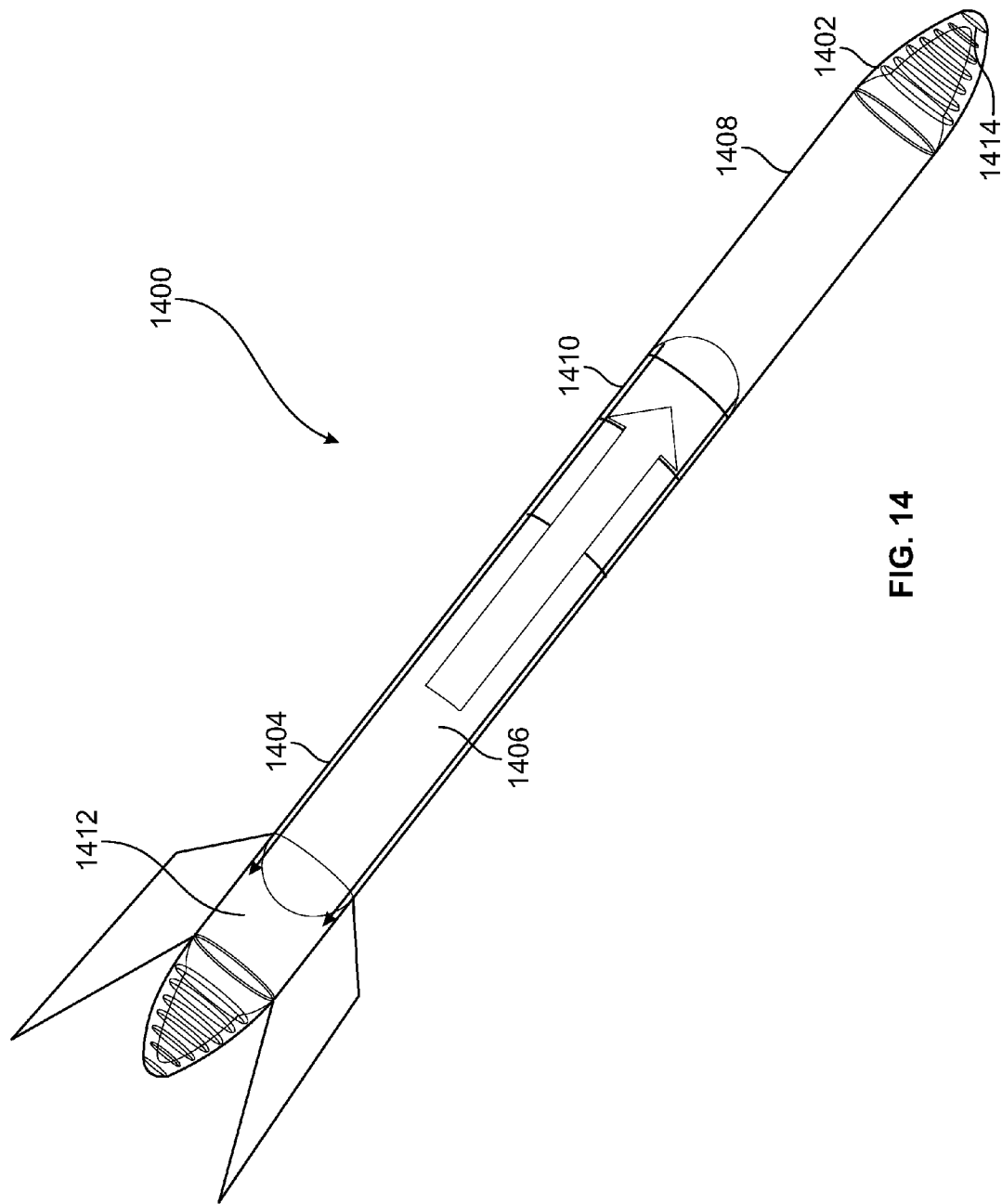
FIGS. 14 and 15 depict another example deployable apparatus in accordance with the teachings of this disclosure.
Figure 15:
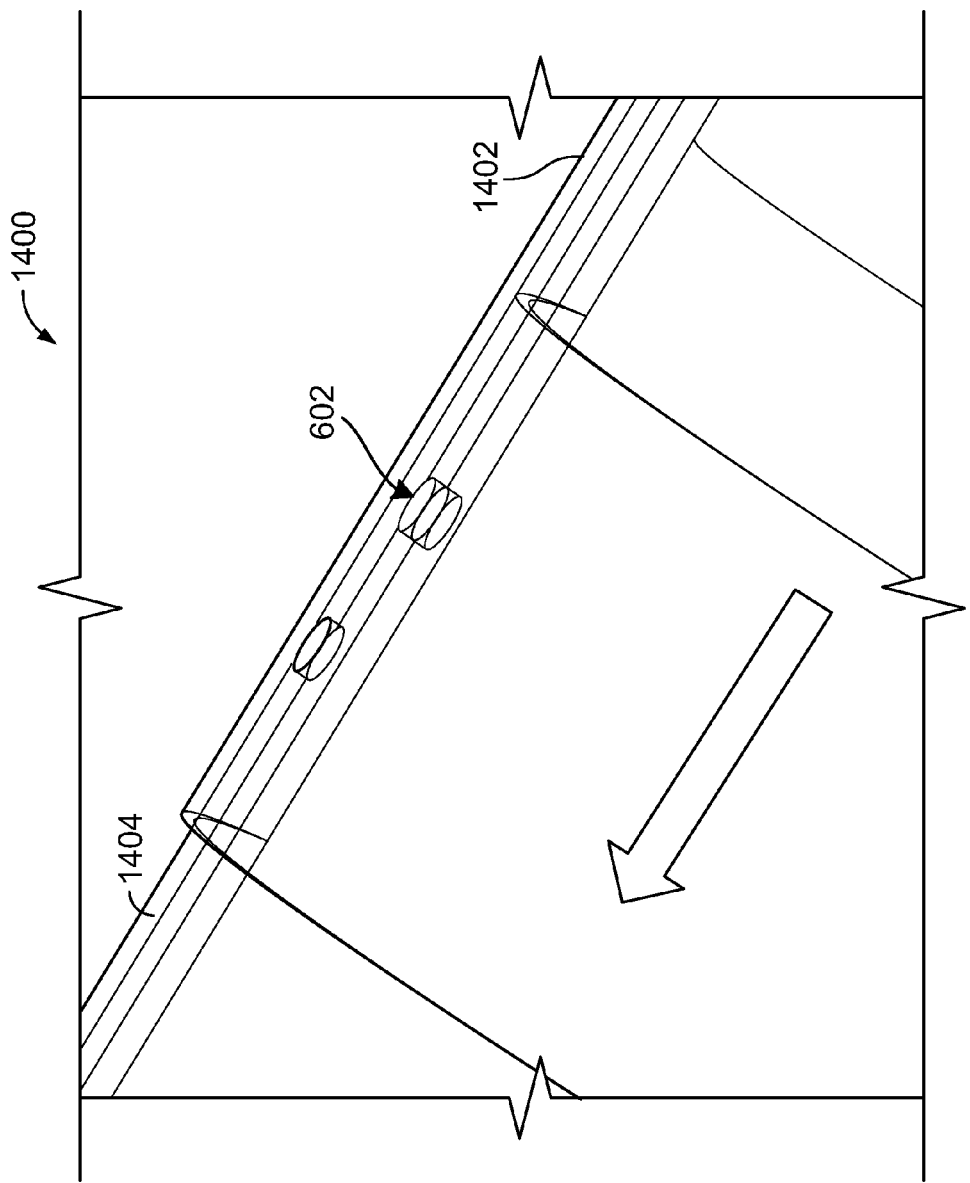

FIGS. 14 and 15 illustrate an example apparatus and/or pod 1400 that may be used to implement the examples disclosed herein. The pod 1400 may be at least partially formed by a first tube, a forward tube, or an outer tube 1402. The pod 1400 further includes a second tube, an aft tube, or an inner tube 1404 at least partially positioned and slidable within the forward tube 1402, and further includes a third central tube, or contents tube 1406 at least partially positioned within the forward and/or aft tubes 1402, 1404. The contents tube 1406 and/or the forward tube 1402 may include supplies, cargo and/or contents positioned therein.

In the illustrated example, to controllably decelerate the contents of the pod 1400 when the pod 1400 impacts the ground, the tubes 1404 and/or 1406 move forward and compresses the fluid within a portion 1408 between the tubes 1402, 1404, and 1406 and forces or expels the fluid external to the tubes 1402, 1404 and/or 1406 through a gap 1410 positioned between the tubes 1402, 1404 and/or 1406.

Additionally or alternatively, to controllably decelerate the contents of the pod 1400 when the pod 1400 impacts the ground, a vacuum is created in a portion 1412 between the tubes 1404, 1406 as the contents tube 1406 moves forward relative to the tubes 1402, 1404. In some examples, to depressurize the portion 1408, the contents tube 1406 includes a spike and/or rod that punctures a nose cone 1414 at the end of the travel of the tubes 1402, 1404 and/or 1406 relative to each other and/or once the tubes 1402, 1404 and/or 1406 are in the second compressed position. In some examples, the aft tube portion 1406 includes a burst disc and/or breakaway plug to enable pressure to equalize in the portion 1412 at the end of the travel of the tubes 1402, 1404 and/or 1406 relative to each other and/or in the second compressed position.

In some examples and as shown in FIG. 15, the pod 1400 includes one or more brakes 602 (e.g., a cutter as described above) coupled to the aft tube 1404 that are used to cut the forward tube 1402 upon impact as discussed above. In some examples, the aft tube 1404 includes an inwardly facing stop and/or protrusion adjacent the brake(s) 602 that is engaged by the contents tube 1406 as it moves forward to cause the brake(s) to frictionally engage the forward tube 1402 once the contents tube 1406 is at the end of its travel.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
   a first tube portion forming a portion of an air vehicle deployable pod, the air vehicle deployable pod to be deployed from an aircraft;
   a second tube portion, the first and second tube portions being slidably coupled;
   a cavity formed by at least one of the first tube portion or the second tube portion, the second tube portion to slide relative to the first tube portion to change a size of the cavity and dissipate energy upon impact of the first tube portion with a deployment area, the impact to deform the air vehicle deployable pod; and
   a gap between the first and second tube portions, the gap to enable a fluid to flow from the cavity to an atmosphere surrounding the tube portions upon impact of the first tube portion.

2. The apparatus of claim 1, wherein the gap is dimensioned to restrict the flow of the fluid to dissipate the energy upon impact of the first tube portion and to protect contents within one of the tube portions.

3. The apparatus of claim 1, wherein the second tube portion is dimensioned to be slidably disposed within the first tube portion.

4. The apparatus of claim 1, further comprising a fin on one of the tube portions, the first and second tube portions being moveable between a non-deployed position having a first length and a deployed position having a second length greater than the first length, in the non-deployed position, the air vehicle deployable pod to be carried by the aircraft, upon deployment from the aircraft, the fin to cause the tube portions to move away from each other and into the deployed position.

5. The apparatus of claim 1, further comprising a third tube portion disposed between the first and second tube portions, the third tube portion to hold contents to be delivered to a location.

6. The apparatus of claim 1, further comprising an energy absorbing nose cone, the nose cone to include at least one of crushable foam or a weight, the weight to at least partially direct flight of the air vehicle deployable pod toward the deployment area after deployment from the aircraft.

7. An apparatus, comprising:
   first and second slidably coupled portions forming an air vehicle deployable pod, the air vehicle deployable pod to be deployed from an aircraft;
   a brake to frictionally engage at least one of the first portion or the second portion upon impact of the first portion with a deployment area, the impact to deform the air vehicle deployable pod; and
   a gap between the first and second portions, the gap to enable a fluid to flow from a cavity to an atmosphere surrounding the tube portions upon impact of the first tube portion with the deployment area, the cavity formed by at least one of the first portion or the second portion.

8. The apparatus of claim 7, wherein the brake comprises a cutter to cut the one of the portions upon impact of the first portion.

9. The apparatus of claim 8, wherein the cutter comprises a knife to extend away from at least one of the first portion or the second portion, the knife having an edge to cut through the at least one of the portions upon impact of the first portion.

10. The apparatus of claim 8, wherein the cutter comprises a fin coupled to the second portion, prior to impact and after deployment from the aircraft, the fin to guide flight of the air vehicle deployable pod toward the deployment area, upon impact, the first portion to move relative to the second portion to cause the fin to cut the first portion.

11. The apparatus of claim 7, wherein the brake comprises a tapered surface of the second portion, the tapered surface to be disposed immediately adjacent an end of the first portion and to at least partially extend toward or into the first portion, the tapered portion to be driven into the first portion upon impact to deform an end of the first portion.

12. The apparatus of claim 7, wherein the first and second portions are moveable between a non-deployed position having a first length and a deployed position having a second length greater than the first length, in the non-deployed position, the air vehicle deployable pod to be carried by an aircraft, upon deployment from the aircraft, the brake is to move to a braking position, the braking position to position the brake substantially perpendicularly relative to a longitudinal axis of the air vehicle deployable pod.

13. The apparatus of claim 12, wherein in the braking position, the brake to extend through an aperture defined by at least one of the first portion or the second portion, in the braking position, the brake to substantially prevent relative movement between the first and second portions following deployment of the air vehicle deployable pod and prior to impact with the deployment area.

14. The apparatus of claim 12, wherein the brake is a spring loaded cutter that is biased toward the braking position.

15. The apparatus of claim 7, wherein the first and second portions are moveable between a non-deployed position having a first length and a deployed position having a second length greater than the first length, in the non-deployed position, the air vehicle deployable pod to be carried by the aircraft, upon deployment from the aircraft, the first and second portions to move apart in flight to a deployed position to lengthen the air vehicle deployable pod.

16. An apparatus, comprising:
   first and second slidably coupled tube portions to be deployed from an air vehicle; and
   means for dissipating energy upon impact of the first tube portion on a surface associated with a location to which supplies are to be delivered, the impact to deform the first tube portion or the second tube portion, wherein the means for dissipating enemy comprises at least one of a brake or a fluid disposed in a cavity to flow through a gap to an atmosphere surrounding the first and second tube portions upon impact of the first tube portion with the surface, the gap disposed between the first and second tube portions, the cavity being defined by at least one of the first tube portion or the second tube portion.

17. The apparatus of claim 16, wherein the means for dissipating energy further comprises a deformable nose cone covering an end of the first tube portion.

18. The apparatus of claim 16, wherein the first and second portions are moveable between a non-deployed position having a first length and a deployed position having a second length greater than the first length, in the non-deployed position, the apparatus to be carried by an aircraft, upon deployment from the aircraft, the apparatus includes means for urging the first and second tube portions to extend away from each other to enable the apparatus to move to the deployed position.

19. The apparatus of claim 5, wherein the third tube portion includes at least one enclosed end, the third tube portion to move relative to the first tube portion upon impact of the first tube portion to at least partially dissipate the energy.

20. The apparatus of claim 9, wherein the knife is pivotal relative to the first portion to a cutting position, in the cutting position, the knife to extend substantially perpendicularly relative to an outer surface of at least one of the first portion or the second portion.

21. The apparatus of claim 1, further including a coupling on the first tube portion or the second tube portion, the coupling to interact with a bomb rack of the aircraft to couple the air vehicle deployable pod to the aircraft.

22. The apparatus of claim 1, wherein the second tube portion includes capped ends.

23. The apparatus of claim 1, wherein the first and second tube portions are moveable between a non-deployed position having a first length and a deployed position having a second length greater than the first length, in the non-deployed position, the air vehicle deployable pod to be carried by an aircraft, upon deployment from the aircraft, a container carried by the air vehicle deployable pod to release a fluid to urge the first and second tube portions away from each other and toward the deployed position.

24. The apparatus of claim 23, wherein the fluid includes carbon dioxide.

25. The apparatus of claim 24, further including a sensor carried by the air vehicle, the sensor to cause the fluid to be released from the container in response to a condition being met.

26. The apparatus of claim 1, wherein the second tube portion includes fins to guide flight of the air vehicle deployable pod toward the deployment area upon deployment from the aircraft.

* * * * *